United States Patent
Horii et al.

(10) Patent No.: US 10,768,721 B2
(45) Date of Patent: Sep. 8, 2020

(54) MODEL CONTROLLER

(71) Applicant: HEWLETT-PACKARD DEVELOPMENT COMPANY, L.P., Houston, TX (US)

(72) Inventors: Hiroshi Horii, Palo Alto, CA (US); Kevin Smathers, Palo Alto, CA (US); Ian N. Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/088,613

(22) PCT Filed: Jan. 17, 2017

(86) PCT No.: PCT/US2017/013714
§ 371 (c)(1),
(2) Date: Sep. 26, 2018

(87) PCT Pub. No.: WO2018/136028
PCT Pub. Date: Jul. 26, 2018

(65) Prior Publication Data
US 2019/0107901 A1    Apr. 11, 2019

(51) Int. Cl.
*G06F 3/0354* (2013.01)
*G06F 3/0362* (2013.01)
(Continued)

(52) U.S. Cl.
CPC ........ *G06F 3/03549* (2013.01); *G06F 3/0354* (2013.01); *G06F 3/0362* (2013.01); *G06F 3/0487* (2013.01); *G06F 3/04845* (2013.01)

(58) Field of Classification Search
CPC ............. G06F 3/03549; G06F 3/03541; G06F 3/03546
See application file for complete search history.

(56) References Cited

U.S. PATENT DOCUMENTS

| | | | |
|---|---|---|---|
| 4,933,670 A | 6/1990 | Wislocki | |
| 4,952,919 A | * 8/1990 | Nippoldt | ............. G06F 3/03549 345/163 |

(Continued)

FOREIGN PATENT DOCUMENTS

| | | |
|---|---|---|
| EP | 2960889 A1 | 12/2015 |
| JP | 2001344068 A | 12/2001 |
| WO | 2012022764 A1 | 2/2012 |

OTHER PUBLICATIONS

"Creating a 3D Model Viewer—Tutorial", Coppercube Documentation, Retrieved from Internet: http://www.ambiera.com/coppercube/doc/cnt_3d_model_viewer.html, May 28, 2009, 4 pages.

(Continued)

*Primary Examiner* — Lixi C Simpson
(74) *Attorney, Agent, or Firm* — Fabian VanCott

(57) ABSTRACT

A model controller includes a trackball, a first sensor adjacent to the trackball to detect a first coordinate movement of the trackball, and a second sensor adjacent to the trackball to detect a second and a third coordinate movement of the trackball. The model controller further includes a third sensor to detect movement of the model controller along a surface, and a fourth sensor to detect movement of a wheel coupled to the model controller.

18 Claims, 15 Drawing Sheets

(51) Int. Cl.
   *G06F 3/0484*   (2013.01)
   *G06F 3/0487*   (2013.01)

(56) References Cited

U.S. PATENT DOCUMENTS

| | | | |
|---|---|---|---|
| 5,280,276 A | 1/1994 | Kwok | |
| 5,298,919 A * | 3/1994 | Chang | G06F 3/0312 |
| | | | 345/163 |
| 7,295,947 B2 | 11/2007 | Kurth et al. | |
| 8,068,136 B2 | 11/2011 | Protola et al. | |
| 8,325,138 B2 | 12/2012 | Touma et al. | |
| 8,781,151 B2 | 7/2014 | Marks et al. | |
| 9,536,163 B2 | 1/2017 | Veeser et al. | |
| 2002/0054011 A1 * | 5/2002 | Bruneau | A63F 13/06 |
| | | | 345/156 |
| 2003/0080942 A1 * | 5/2003 | Danzyger | G06F 3/03543 |
| | | | 345/163 |
| 2003/0169235 A1 | 9/2003 | Gron et al. | |
| 2005/0088412 A1 * | 4/2005 | Walton | G06F 3/03543 |
| | | | 345/163 |
| 2005/0179652 A1 * | 8/2005 | Ludwig | G06F 3/0346 |
| | | | 345/156 |
| 2006/0033717 A1 * | 2/2006 | Beach | G06F 3/0338 |
| | | | 345/167 |
| 2007/0206030 A1 | 9/2007 | Lukis | |
| 2008/0010616 A1 | 1/2008 | Algreatly | |
| 2011/0221677 A1 * | 9/2011 | Cavacuiti | G06F 3/03549 |
| | | | 345/167 |
| 2012/0139744 A1 * | 6/2012 | Ridgway | G01D 13/22 |
| | | | 340/815.4 |
| 2012/0306438 A1 | 12/2012 | Howard | |
| 2013/0279749 A1 | 10/2013 | Kaiser-Pendergrast | |
| 2014/0002362 A1 * | 1/2014 | Srivastava | G06F 3/03549 |
| | | | 345/167 |
| 2016/0062475 A1 | 3/2016 | Gombert | |

OTHER PUBLICATIONS

Miller, "Axsotic 3D mouse takes a spherical stab at an age-old problem", Retrieved from Internet: https://www.engadget.com/2010/11/09/axsotic-3d-mouse-takes-a-spherical-stab-at-an-age-old-problem/, Nov. 9, 2010, 9 pages.

McLlroy, P., et al., Kinectrack: Agile 6-DoF Tracking Using a Projected Dot Pattern, 2012, < http://ieeexplore.ieee.org/stamp/stamp.jsp?arnumber=6402533 >.

* cited by examiner

US 10,768,721 B2

MODEL CONTROLLER

BACKGROUND

Input devices such as a controller, a mouse, a touchpad, a pointing stick, a touchscreen, a joy stick, and a trackball, among others, may be used to control the movement of on-screen position identifiers such as pointers. Further, input devices may be used to move objects on the screen, or perform other selection and positional processes with regard to objects displayed on a display device. For example, a controller may be used to manipulate the position, location, and perspective of a two-dimensional (2D) or three-dimensional (3D) object in a computer-aided design (CAD) program in up to six degrees of freedom.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
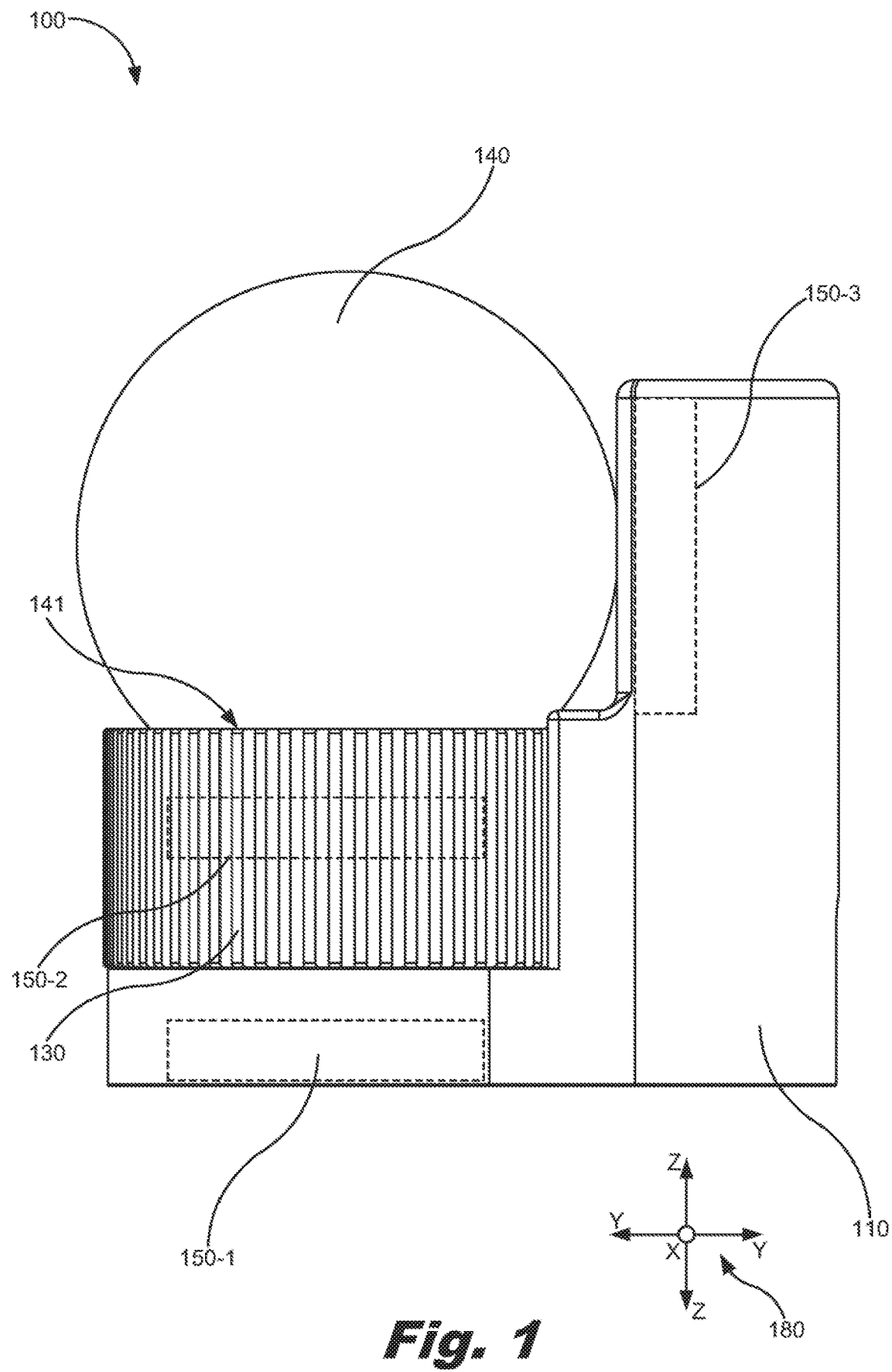
FIG. 1 is a side view of a controller, according to one example of the principles described herein.

As described above, a controller may be any device that allows for the selection or manipulation of an object rendered on a display device in up to six degrees of freedom. In some examples, however, a user may find it inconvenient or difficult to use a first controller that provides for selection and movement of an object on a screen in a limited manner, and also use a second controller to select or move the object in a manner not provided by the first controller. Further, the user may find it difficult to also utilize other input devices such as a keyboard, a touchpad, a pointing stick, a touchscreen, or similar device to make modifications to the object using two separate controllers.

Still further, in some examples, a user may also be utilizing a virtual reality system during their use of a controller in order to manipulate and modify objects in the virtual reality, 3D space. In this example, the user may wear a virtual reality headset, and is unable to see beyond the headset to also see, for example, a keyboard, a second controller, a touchpad, a pointing stick, a touchscreen, or other input devices. The user is unable, or may find it extremely difficult to orient himself or herself in order to use two or more different controllers to orient the object in the display of the virtual reality system as well as make modifications to the object using the keyboard, the touchpad, the pointing stick, the touchscreen, or other input device.

Further, when using 3D CAD programs for the first time, a user may be taught to use the keyboard and another control device such as a mouse to control a 3D model. For example, a mouse button click may be used to rotate the 3D model and a wheel may be used to zoom the 3D model in and out. In another example a simultaneous selection of a command (cmd) button and a mouse click may be used to pan the 3D model by dragging the mouse in the panning direction. In still another example, a simultaneous selection of a shift button and the mouse click may be used to zoom the 3D model in and out. Thus, in many instances, a user may find it difficult or inconvenient to handle two separate devices in moving and manipulating a 3D model or other object displayed on a display device.

Examples described herein provide a model controller. The model controller includes a trackball, a first sensor adjacent to the trackball to detect a first coordinate movement of the trackball, a second sensor adjacent to the trackball to detect a second and a third coordinate movement of the trackball, a third sensor to detect movement of the model controller along a surface, and a fourth sensor to detect movement of a wheel coupled to the model controller. The first, second, and third coordinate movements of the trackball may define the roll, pitch, and yaw of a model. The movement of the model controller along the surface as detected by the third sensor may define a panning of the model. The movement of a wheel coupled to the model controller as detected by the fourth sensor defines a zooming of the model.

The first sensor and the second sensor are located on different planes. In one example, the different planes are approximately perpendicular to one another, obtuse with respect to one another, or acute with respect to one another. The model controller may further include a number of buttons. The activation of at least one of the buttons may result in a mode selection.

Examples described herein also provide a system for three-dimensional (3D) model manipulation. The system includes a 3D model controller to control a display of a 3D model on a display device. The 3D model controller includes a trackball, a first sensor adjacent to the trackball to detect a first coordinate movement of the trackball, a second sensor adjacent to the trackball to detect a second and a third coordinate movements of the trackball, a third sensor to detect movement of the 3D model controller along a surface, and a fourth sensor to detect movement of a wheel coupled to the model controller. In one example, the first, second, and third coordinate movements of the trackball define the roll, pitch, and yaw of a 3D model. In one example, the movement of the 3D model controller along the surface as detected by the third sensor defines a panning of the 3D model. In one example, the movement of the wheel coupled to the model controller as detected by the fourth sensor defines a zooming of the model.

The system may also include a second input device to, when activated, modify a number of elements of the 3D model. In one example, the second input device may be a mouse, a digital pen, a digital pad, a touchpad, a keyboard, another input device, or combinations thereof. In one example, the display may include a virtual reality display, wherein actuation of the trackball, the wheel, the third sensor, or a combination thereof is displayed on the virtual reality display. Further, in one example, the first, second and third sensors may be optical sensors.

Examples described herein also provide a computer program product for interpreting input of a three-dimensional (3D) model controller. The computer program product includes a non-transitory computer readable storage medium including computer usable program code embodied therewith. The computer usable program code, when executed by a processor defines a first coordinate movement of a 3D model based on rotation of a trackball of the 3D model controller as detected by a first sensor, defines a second coordinate movement and a third coordinate movement of the 3D model based on rotation of the trackball of the 3D model controller as detected by a second sensor, defines panning of the 3D model based on movement of the 3D model controller along a surface, and defines a zoom level of the 3D model based on activation of a wheel of the 3D model controller. In one example, the first, second, and third coordinate movements define the roll, pitch, and yaw of the 3D model.

In one example, the computer program product may further include computer usable program code to, when executed by the processor define a modification to the 3D model based on a second input device to, when activated, modify a number of elements of the 3D model. In one example, the computer program product may further include computer usable program code to, when executed by the processor, display movement of the 3D model on a display device based on the first, second, and third coordinate movements.

In one example, the computer program product may further include computer usable program code to, when executed by the processor, display panning of the 3D model based on movement of the 3D model controller along the surface. Further, in one example, the computer program product may further include computer usable program code to, when executed by the processor display a change in the zoom level of the 3D model based on activation of the wheel of the 3D model controller.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 2:
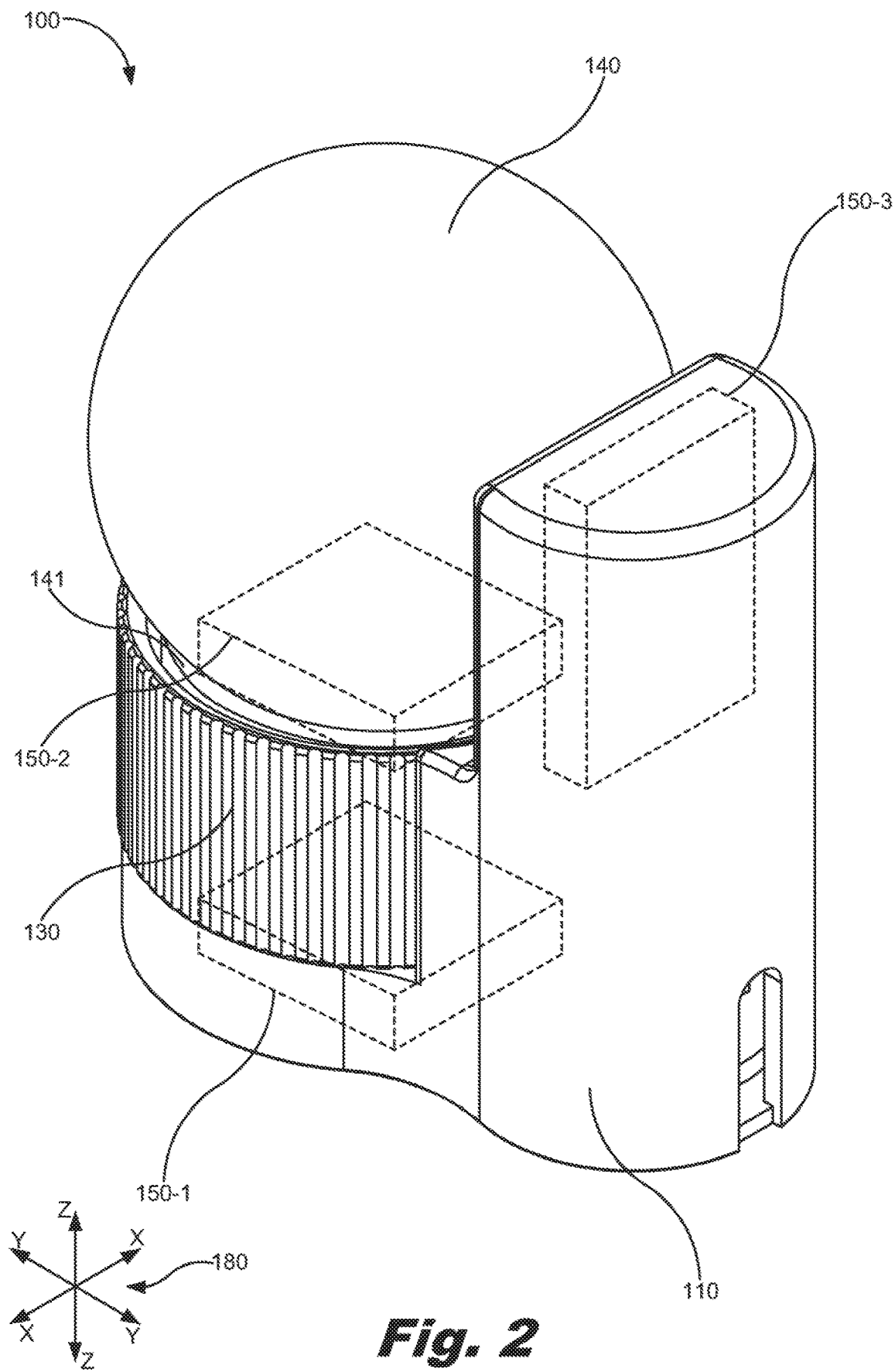
FIG. 2 is a perspective view of the controller of FIG. 1, according to one example of the principles described herein.
Figure 3:
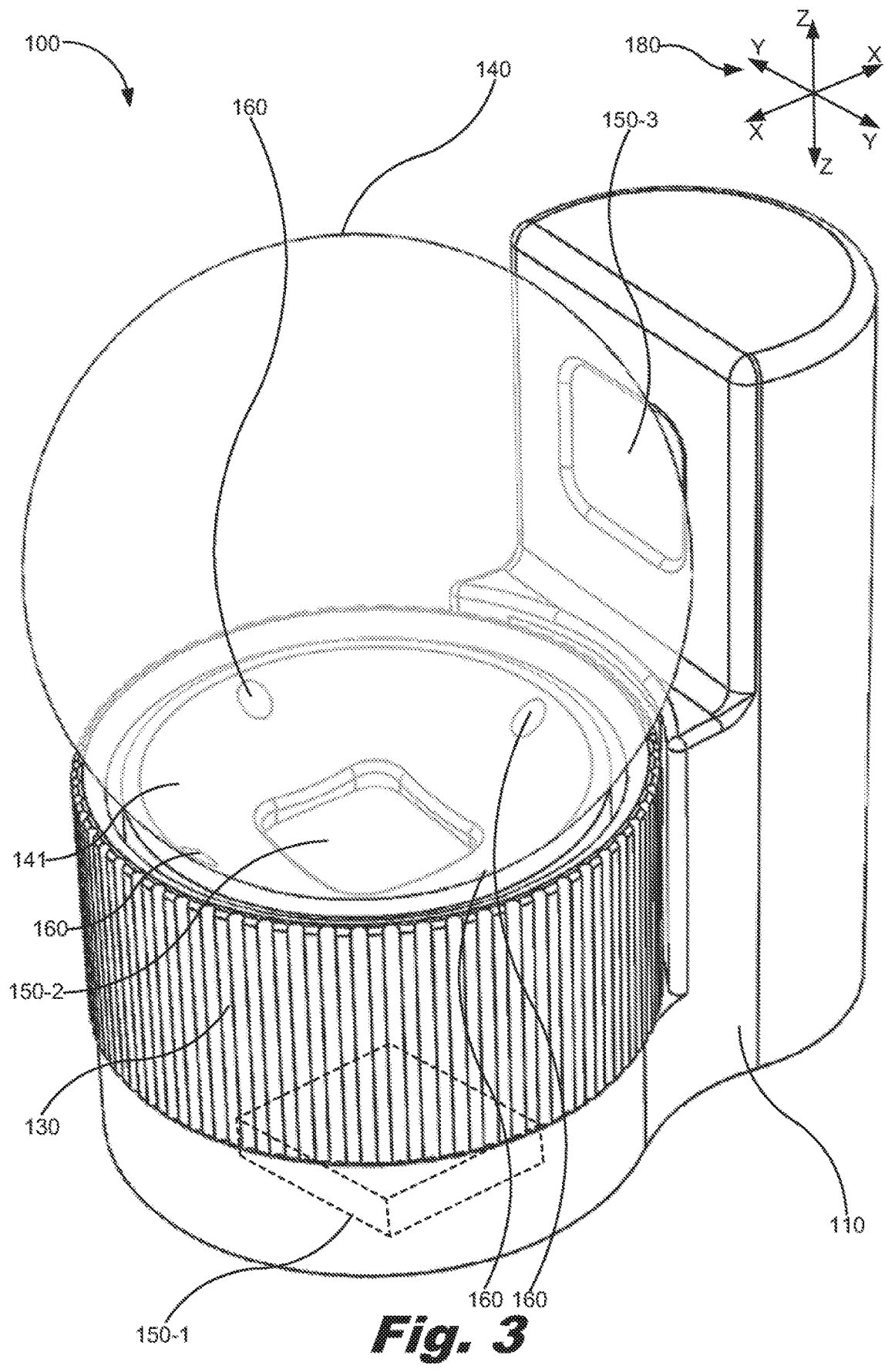
FIG. 3 is a perspective view of the controller of FIG. 1 depicting a trackball in ghost and a number of sensors, according to one example of the principles described herein.

Turning now to the figures, FIGS. 1 through 3 will now be described in connection with a first example of the controller (100). FIG. 1 is a side view of a controller (100), according to one example of the principles described herein. FIG. 2 is a perspective view of the controller (100) of FIG. 1, according to one example of the principles described herein. FIG. 3 is a perspective view of the controller (100) of FIG. 1 depicting a trackball (140) in ghost and a number of sensors (150-1, 150-2, 150-3), according to one example of the principles described herein. The controller (100) may be used in connection with a computing device and a display device as a hardware interface in order to pan, rotate, and zoom an object such as a 2D or 3D object displayed by a program executed by the computing device on the displayed device. In one example, the controller (100) may be a peripheral device coupled to the computing device.

The controller (100) may include a number of elements including a body (110) to support a wheel (130), a trackball (140), and at least three sensors (150-1, 150-2, 150-3). The sensors (150-1, 150-2, 150-3) may be any sensor that detects movement, and converts real world, analog detected data, into data that the computer may understand using an analogue-to-digital (ADC) converter. In one example, the sensors (150-1, 150-2, 150-3) may include a number mechanical elements or sensors that detect movement of the wheel (130), the trackball (140) or the controller (100) relative to a surface. In another example, the sensors (150-1, 150-2, 150-3) may be optical sensors that detect movement of the wheel (130), the trackball (140) or the controller (100) relative to a surface using emitted and/or detected electromagnetic radiation.

The wheel (130) may be any rotatable element that, when rotated, is identifiable as a panning, rotation, or zooming of the displayed object. In one example, the wheel (130) is rotatable in one direction making the wheel (130) a dual input device where rotation in a first direction is one input, and rotation in a second direction is another input. In one example, the wheel (130) may be used as an input to cause a selected object displayed on the display device to zoom in and out and cause the selected object to scale larger or smaller, respectively. The wheel (130) may include a number of detector mechanisms that detect the rotation of the wheel (130) about an axis. In the example of FIGS. 1 through 3, the axis of rotation is around the Z-axis as indicated by the coordinate indicator (180). In one example, the wheel (130) is rotatable about a portion of the body (110) of the controller (100).

The trackball (140) may be any sphere that, when rotated in any direction including yaw, pitch, and roll, or combinations thereof is identifiable as a panning, rotation, or zooming of the displayed object. Thus, in one example, the trackball (140) is rotatable in any direction or combination of directions. The controller (100) detects yaw, pitch, and roll of the trackball (140) through the use of at least two sensors (150-2, 150-3). In one example, the two sensors (150-2, 150-3) detect the movement of the trackball (140) as to yaw, pitch, and roll. In one example, a first one of the sensors (150-2, 150-3) detects two of the yaw, pitch, and roll movements with the second one of the sensors (150-2, 150-3) detecting one of yaw, pitch, and roll that is not detected by the first sensor (150-2, 150-3). For example, sensor (150-2) may detect pitch and roll, and sensor (150-3) may detect yaw. In one example, movement of the trackball (140) as detected by the sensors (150-2, 150-3) causes a selected object displayed on the display device to move in a corresponding manner to cause the object to yaw, pitch, and roll. Further, in one example, the sensors are optical sensors.

In one example, the trackball (140) may be held by a socket built into the body (110) of the controller (100). In another example, less than half of the trackball (140) or less than a quarter of the trackball (140) may be covered by a portion of the body (110) to allow a user to touch and interact with a relatively larger portion of the surface of the trackball (140). This allows the user to conveniently manipulate the rotation of the trackball (140) by providing to a user access to more of the surface of the trackball (140). This increased exposure to the surface of the trackball (140) allows a user to take an increased number of positions relative to the controller (100), that, in turn, allows the user to shift hand positions relative to the controller (100). This, in turn, provides more comfort to the user and decreases hand and arm fatigue since the user is not positioning his or her hand in a particular position for long periods of time. Further, exposing a large portion of the trackball (140) with respect to the body (110) of the controller (100) may impart an increased aesthetic quality to the controller (100).

The trackball (140) may be removeable from the controller (100). In this example, the trackball (140) is seated on a sensor bed (141). In one example, the sensor bed (141) may be made of a low-friction material such as, for example, silicon, polytetrafluoroethylene (PTFE) commercially referred to as TEFLON manufacture and distributed by The Chemours Company, or other material with a low coefficient of friction to allow the trackball (140) to smoothly and fluidly rotate on the controller (100). In one example, the trackball (140) may be made of a dense material such as a polymer, a glass, or similar material so that the increased mass causes the trackball (140), when rotated, to coast.

Further, in one example, a number of nodules (160) may be formed on the sensor bed (141). The nodules (160) reduce the amount of contact between the trackball (140) and the sensor bed (141). This reduces the amount of friction that may otherwise exist between the trackball (140) and the sensor bed (141). In one example, the nodules (160) are made of the same material as the sensor bed (141). In another example, the nodules (160) are made of a different material from the sensor bed (141). In one example, the nodules (160) are made of a low-friction material such as, for example, silicon, polytetrafluoroethylene (PTFE) commercially referred to as TEFLON manufacture and distributed by The Chemours Company, or other material with a low coefficient of friction to allow the trackball (140) to smoothly and fluidly rotate on the controller (100).

In the example of FIGS. 1 through 3, the two sensors (150-2, 150-3) may be placed on planes that are approximately perpendicular to one another. In another example, the two sensors (150-2, 150-3) may be placed on planes that are positioned at an acute angle relative to one another. In this example, the trackball (140) may be contained by the body (110) of the controller (100) while still allowing for a large portion of the trackball (140) to be exposed. In still another example, the two sensors (150-2, 150-3) may be placed on planes that are positioned at an obtuse angle relative to one another. In this example, the obtuse angle between the two planes of the two sensors (150-2, 150-3) allows for even more of the surface of the trackball (140) to be exposed, and further provides the user with access to a greater portion of the trackball (140). In yet another example, the two sensors (150-2, 150-3) may be placed on planes that are approximately parallel to one another. In this example, the two sensors (150-2, 150-3) may be positioned on opposite sides of the trackball (140).

A third sensor (150-1) may be embedded in the bottom surface of the controller (100) and exposed to a surface on which the controller is placed. The bottom sensor (150-1) detects movement of the controller (100) along the surface in the x and y directions. In one example, the movement of the controller (100) along the surface as detected by the sensor (150-1) is identifiable as a panning, rotation, or zooming of the displayed object.

Figure 4:
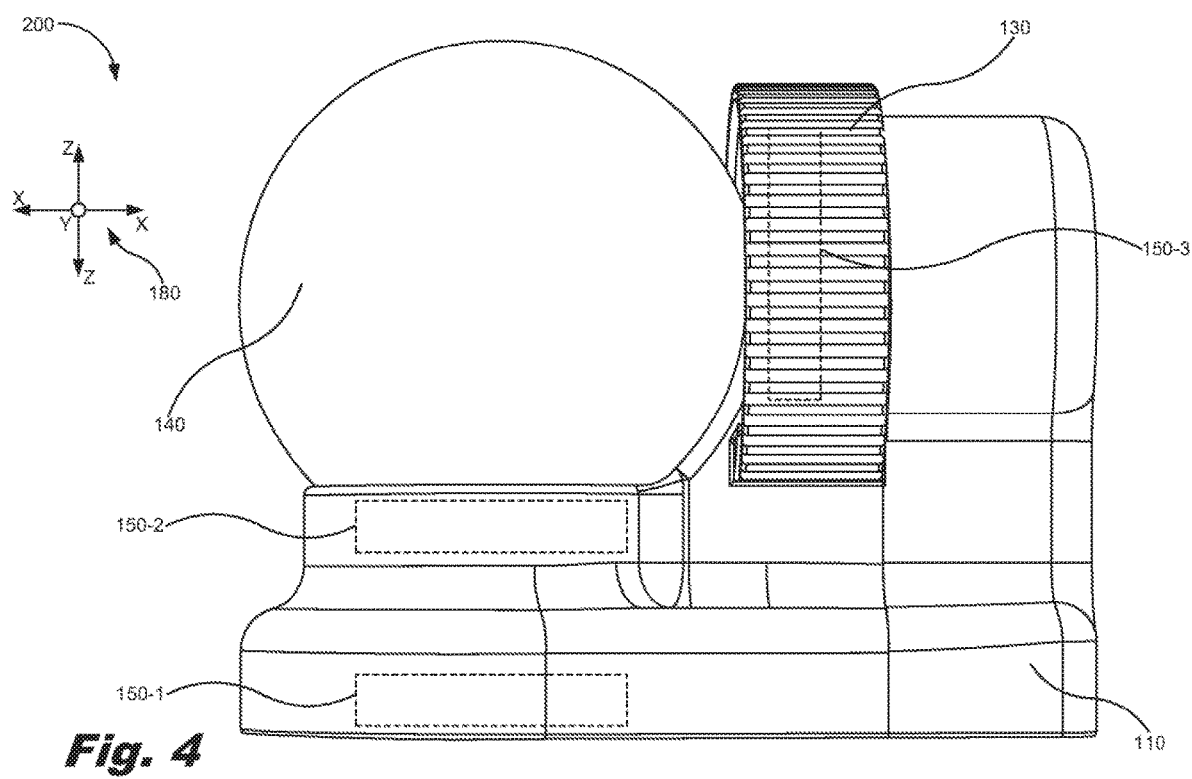
FIG. 4 is a side view of a controller, according to another example of the principles described herein.
Figure 5:
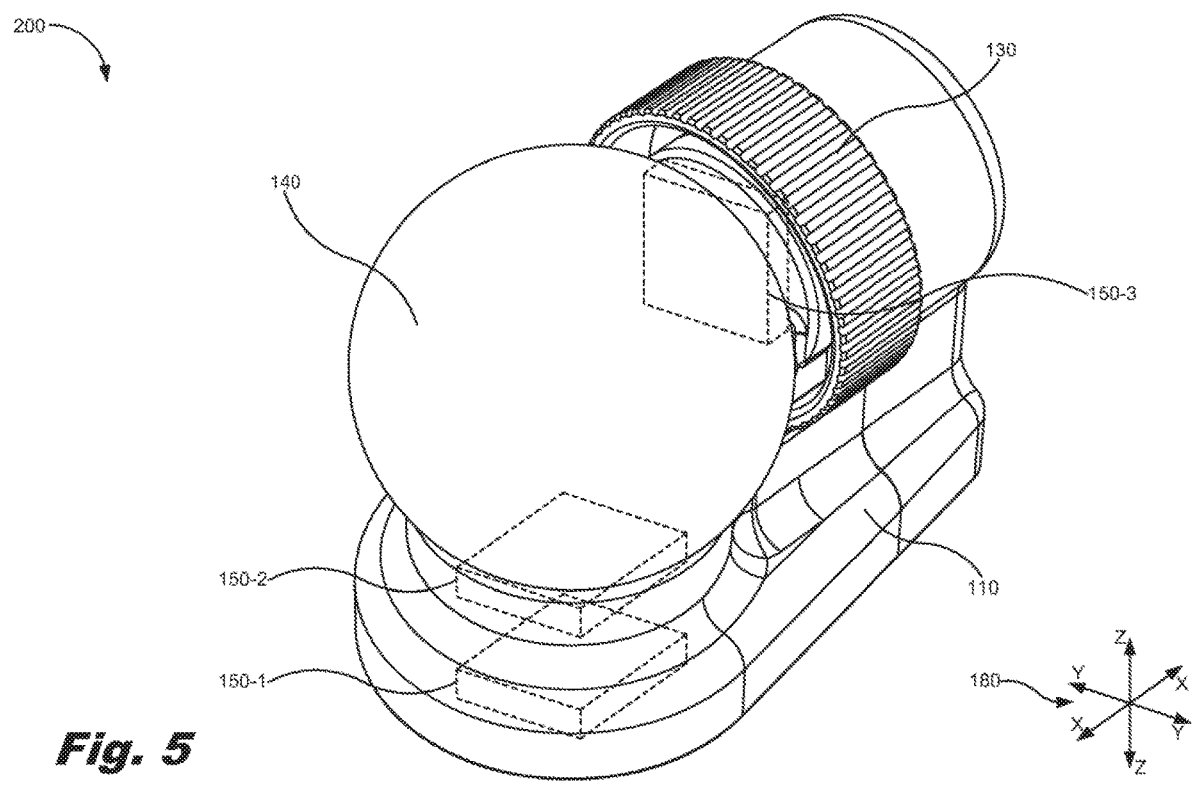
FIG. 5 is a perspective view of the controller of FIG. 4, according to one example of the principles described herein.
Figure 6:
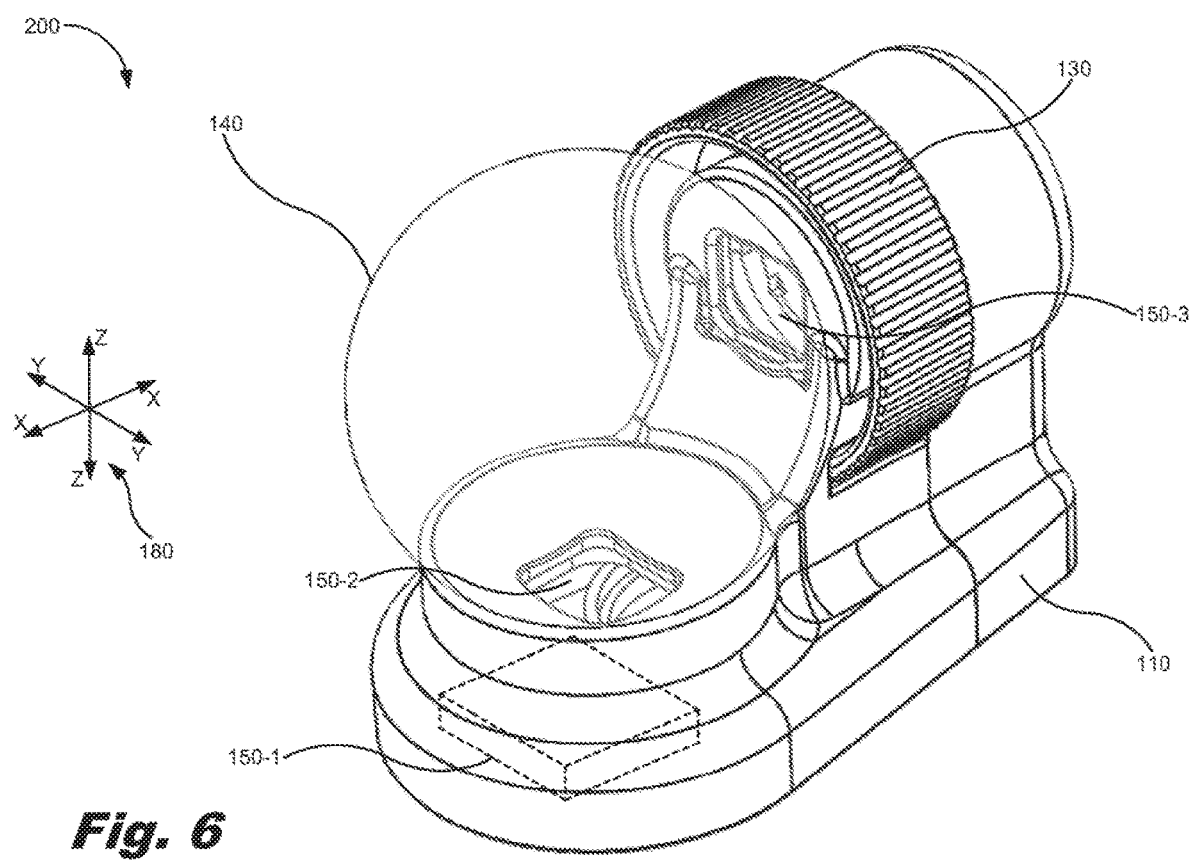
FIG. 6 is a perspective view of the controller of FIG. 4 depicting a trackball in ghost and a number of sensors, according to one example of the principles described herein.

Other examples of the controller (100) will now be described in connection with FIGS. 4 through 12. FIG. 4 is a side view of a controller (200), according to another example of the principles described herein. FIG. 5 is a perspective view of the controller (200) of FIG. 4, according to one example of the principles described herein. FIG. 6 is a perspective view of the controller (200) of FIG. 4 depicting a trackball (140) in ghost and a number of sensors (150-1, 150-2, 150-3), according to one example of the principles described herein. The controller of FIGS. 4 through 6 includes the body (110) to support a wheel (130), a trackball (140) supported by a sensor bed (141), and at least three sensors (150-1, 150-2, 150-3) as similarly described above in connection with FIGS. 1 through 3. However, in different between the example of FIGS. 4 through 6 and the example of FIGS. 1 through 3 is the positioning of the wheel (130). In the example of FIGS. 4 through 6, the wheel (130) is positioned on the body of the controller (100) in a vertical orientation to the side of the trackball (140). In contrast, in the example of FIGS. 1 through 3, the wheel (130) is positioned on the body of the controller (100) in a horizontal orientation below the trackball (140). Having the wheel (130) located to the side of the trackball (140) or below the trackball (140) in two different examples allows a user to choose a layout of actuating devices on the controller (100) that they find to be more ergonomic or meets other stylistic or functional needs of the user.

Figure 7:
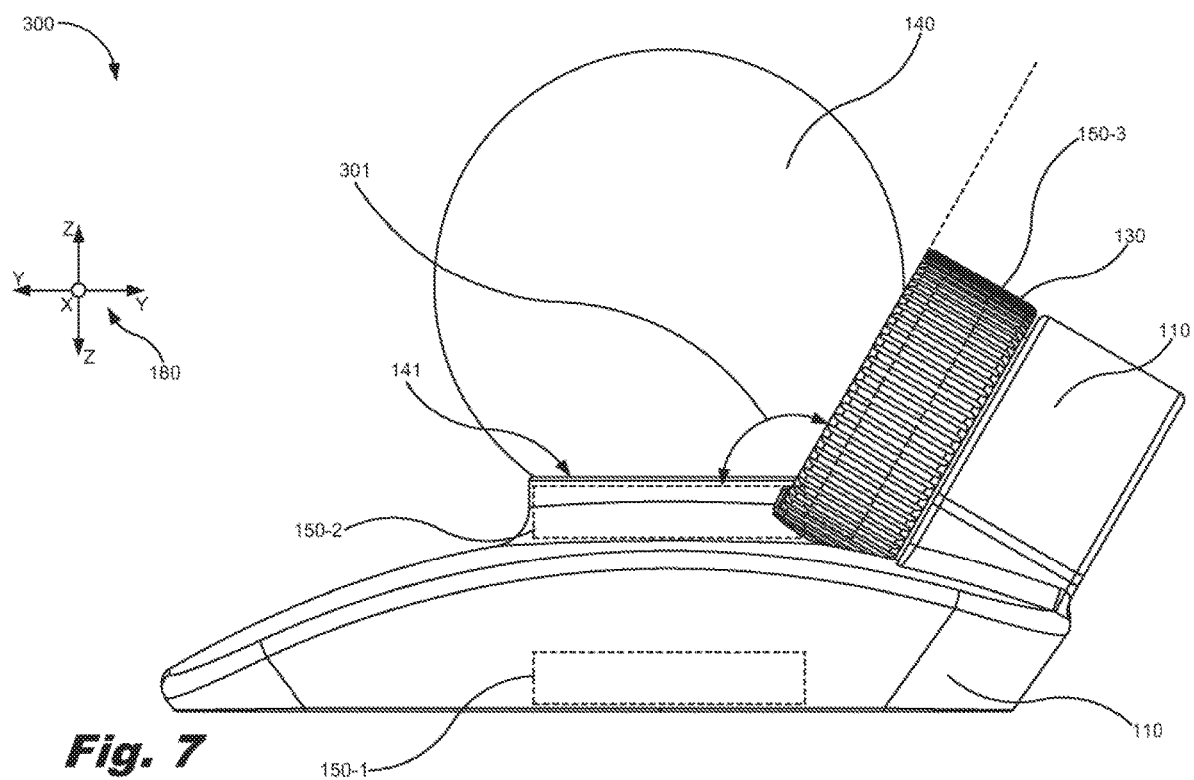
FIG. 7 is a side view of a controller, according to still another example of the principles described herein.
Figure 8:
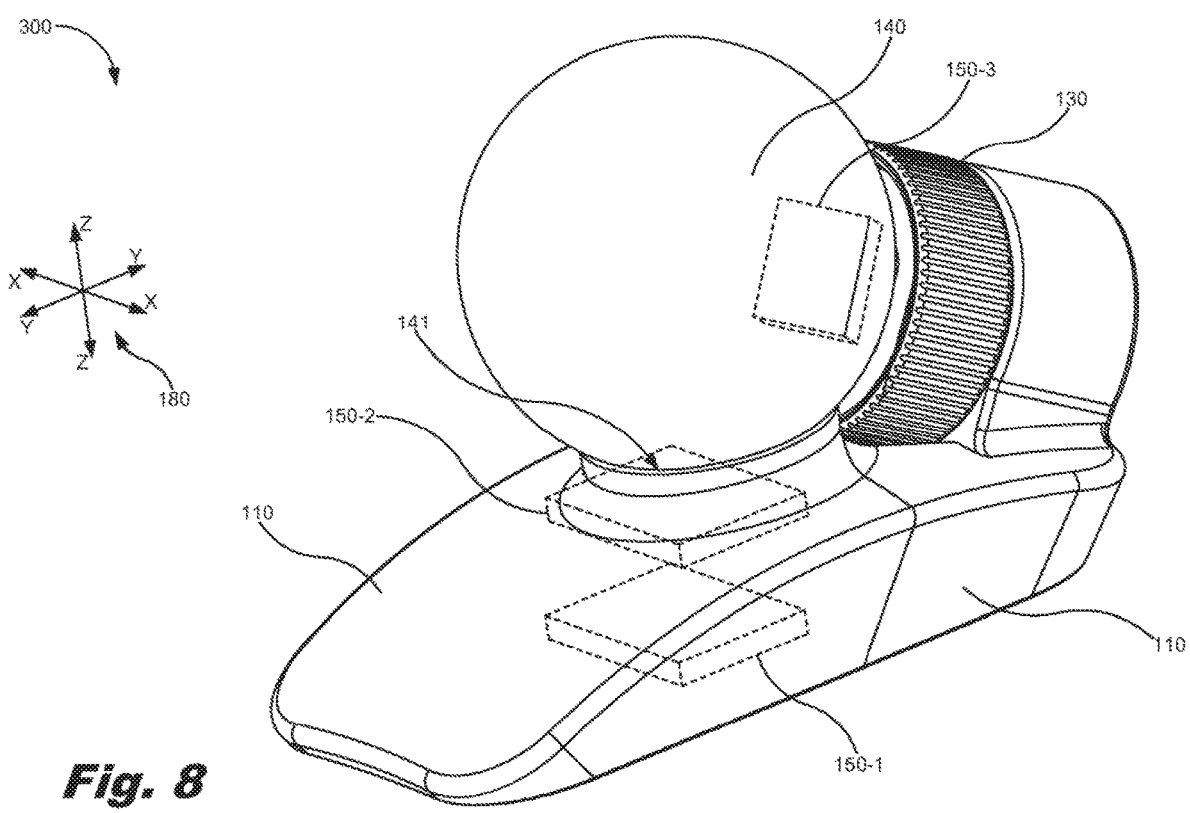
FIG. 8 is a perspective view of the controller of FIG. 7, according to one example of the principles described herein.
Figure 9:
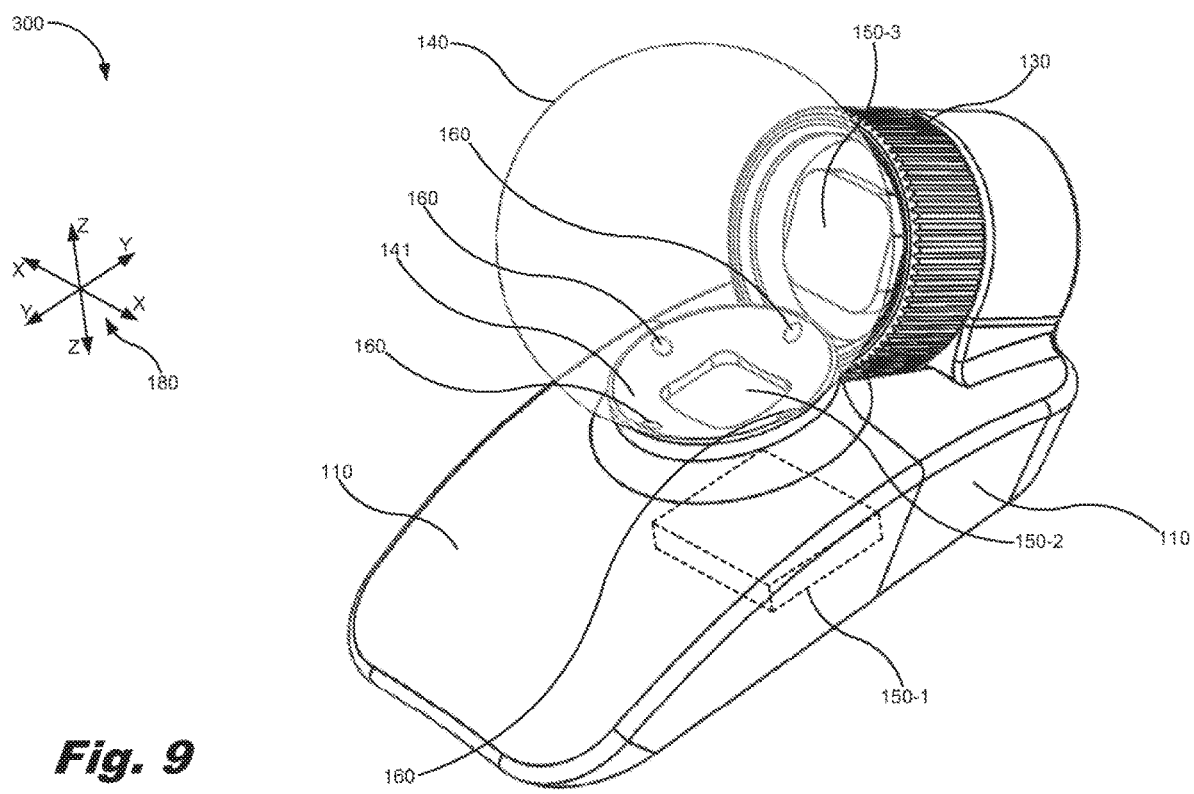
FIG. 9 is a perspective view of the controller of FIG. 7 depicting a trackball in ghost and a number of sensors, according to one example of the principles described herein.

Turning now to the example of FIGS. 7 through 9, FIG. 7 is a side view of a controller (300), according to still another example of the principles described herein. FIG. 8 is a perspective view of the controller (300) of FIG. 7, according to one example of the principles described herein. FIG. 9 is a perspective view of the controller (300) of FIG. 7 depicting a trackball (140) in ghost and a number of sensors (150-1, 150-2, 150-3), according to one example of the principles described herein. The controller of FIGS. 7 through 9 includes the body (110) to support a wheel (130), a trackball (140) supported by a sensor bed (141), and at least three sensors (150-1, 150-2, 150-3) as similarly described above in connection with FIGS. 1 through 6. However, a difference between the example of FIGS. 7 through 9 and other examples described herein is the angle (401) of the two sensors (150-2, 150-3) relative to one another is obtuse or greater than 90 degrees. In one example, angle (301) may be approximately 130 degrees. As mentioned above, the obtuse angle between the two planes of the two sensors (150-2, 150-3) allows for even more of the surface of the trackball (140) to be exposed, and further provides the user with access to a greater portion of the trackball (140). Further, the wheel (130) of FIGS. 7 through 9 may be positioned at an angle relative to the z-plane as identified by the coordinate indicator (180) in order to place the wheel (130) at one side of the angle (301) and provide the obtuse angle between the sensors (150-2, 150-3) without having the wheel (130) obstruct the line of sight of the sensor (150-3) relative to the trackball (140).

The example of FIGS. 7 through 9 allows a user to place his or her hand on top or above the trackball (140) and be able to use the wheel (130) with their fingers. Also, the example of FIGS. 7 through 9 allows the user to move the controller (100) in the X- and Y-directions, or combinations thereof by using the trackball (140) to move the controller (100) along the surface on which the controller (100) is operated. The sensor bed (141) in which the trackball (140) is seated may contain a sufficient portion of the trackball (140) to ensure that the trackball (140) is not separated from the body (110) of the controller (100) during movement of the controller (100) in the X- and Y-directions along the surface.

Figure 10:
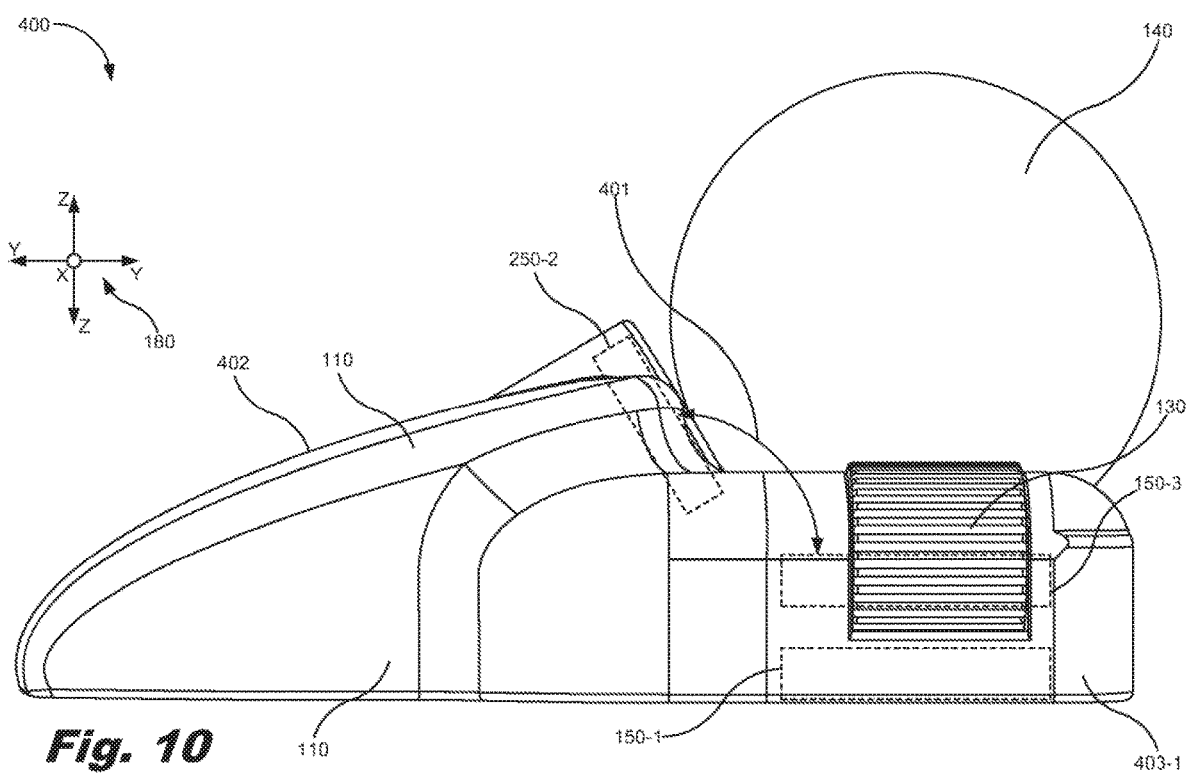
FIG. 10 is a side view of a controller, according to yet another example of the principles described herein.
Figure 11:
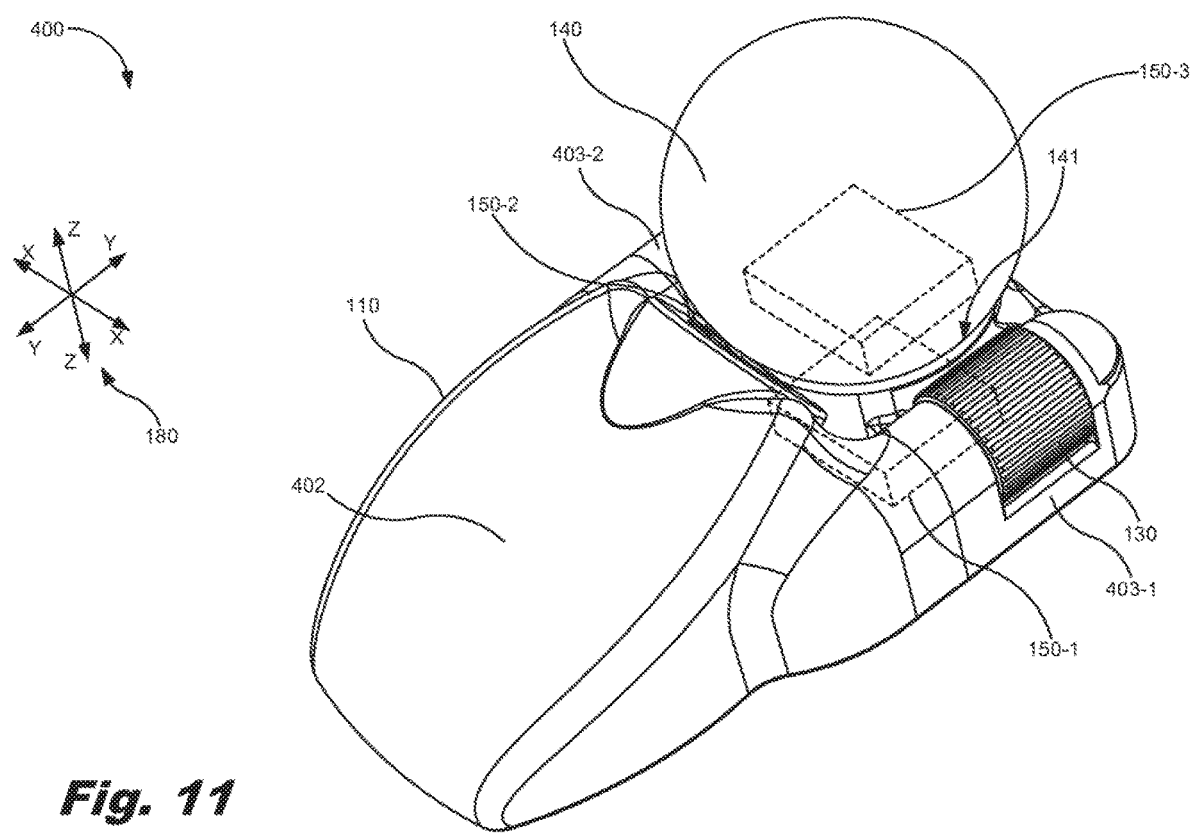
FIG. 11 is a perspective view of the controller of FIG. 10, according to one example of the principles described herein.
Figure 12:
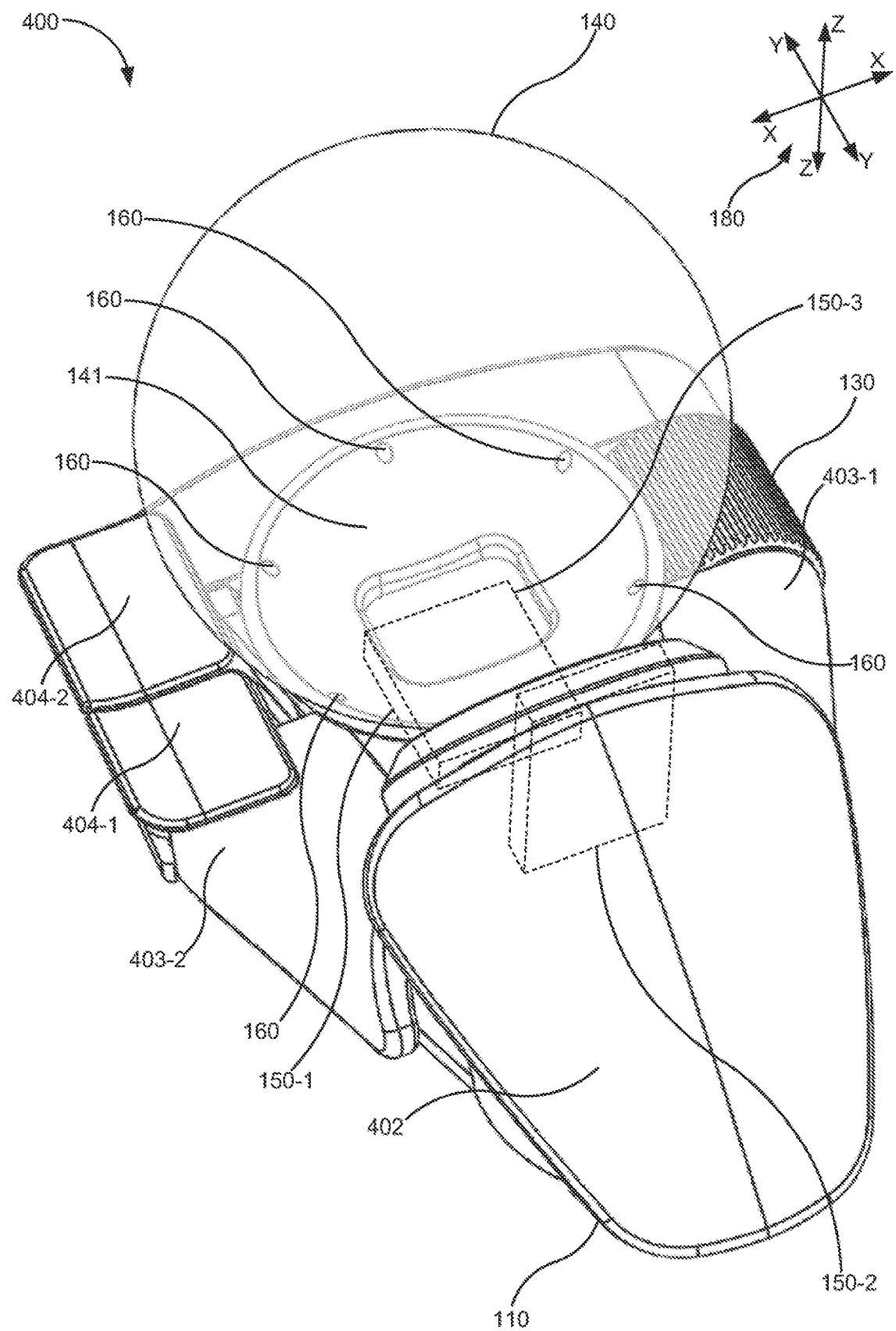
FIG. 12 is a perspective view of the controller of FIG. 10 depicting a trackball in ghost and a number of sensors, according to one example of the principles described herein.

Turning now to the example of FIGS. 10 through 12, FIG. 10 is a side view of a controller (400), according to yet another example of the principles described herein. FIG. 11 is a perspective view of the controller (400) of FIG. 10, according to one example of the principles described herein. FIG. 12 is a perspective view of the controller (400) of FIG. 10 depicting a trackball (140) in ghost and a number of sensors (150-1, 150-2, 150-3), according to one example of the principles described herein. The controller of FIGS. 10 through 12 includes a body (110) to support a wheel (130), a trackball (140) supported by a sensor bed (141), and at least three sensors (150-1, 150-2, 150-3) as similarly described above in connection with FIGS. 1 through 9. However, differences between the example of FIGS. 10 through 12 and other examples described herein include, for example, the layout of the sensors (150-2, 150-3) relative to the trackball (140) and the location of the wheel (130) on the body (110) of the controller (400).

As to the layout of the sensors (150-2, 150-3) relative to the trackball (140), sensor (150-2) may be directed away from a user's hand toward the trackball (140) in contrast to the sensor (150-2) being directed towards the user's hand as depicted in, for example, FIGS. 1 through 9. This allows a user to rest his or her hand on a first portion (402) of the body (110) of the controller (400), and provides an ergonomic controller (400) for the user in this manner.

With regard to the location of the wheel (130) on the body (110) of the controller (400), the wheel (130) may be located on one side or the other of the controller (400), or both sides of the controller. In one example where a single wheel (130) is included on the controller (400), the wheel (130) may be placed on either side of the controller (100) on an arm (403-1, 403-2) located next to the trackball (140). In this example, the wheel (130) may be removed, and placed on the opposite arm (403-1, 403-2). The user may customize the position of the wheel (130) to accommodate for his or her left- or right-handedness or so that the user may toggle and actuate the wheel (130) with, for example, an index finger or a little finger based on what side the wheel (130) is located.

In an example where a wheel (130) is located on both arms (403-1, 403-2) of the controller (400), the function of the two wheels (130) may be identical such that activation of either wheel (130) cause a selected object displayed on the display device to be controlled in an identical manner, or the function of the two wheels (130) may be different such that activation of either wheel (130) cause a selected object displayed on the display device to be controlled in two different ways.

Another difference between the example of FIGS. 10 through 12 and other examples described herein may include a number of buttons (404-1, 404-2) located on an arm (403-1, 403-2) of the controller (400). In this example, the buttons (404-1, 404-2) may be located on either arm (403-1, 403-2), and the wheel (130) may be located on the arm (403-1, 403-2) opposite the buttons (404-1, 404-2) to accommodate for the user's left- or right-handedness or so that the user may actuate the buttons (404-1, 404-2) with, for example, an index finger or a little finger based on what side the wheel (130) the buttons (404-1, 404-2) are located. In one example, the buttons (404-1, 404-2) may be used as a mode or function selection. Modes or functions include, for example, selection of a next model, selection of a previous model, selection of a next object, selection of a previous object, change of a view of an object or objects from an orthographic view to a perspective view and visa versa, selection of a number of drawing elements in connection with a drawing pad or program such as a next drawing tool and a previous drawing tool, other mode and function selections, or combinations thereof.

Figure 13:
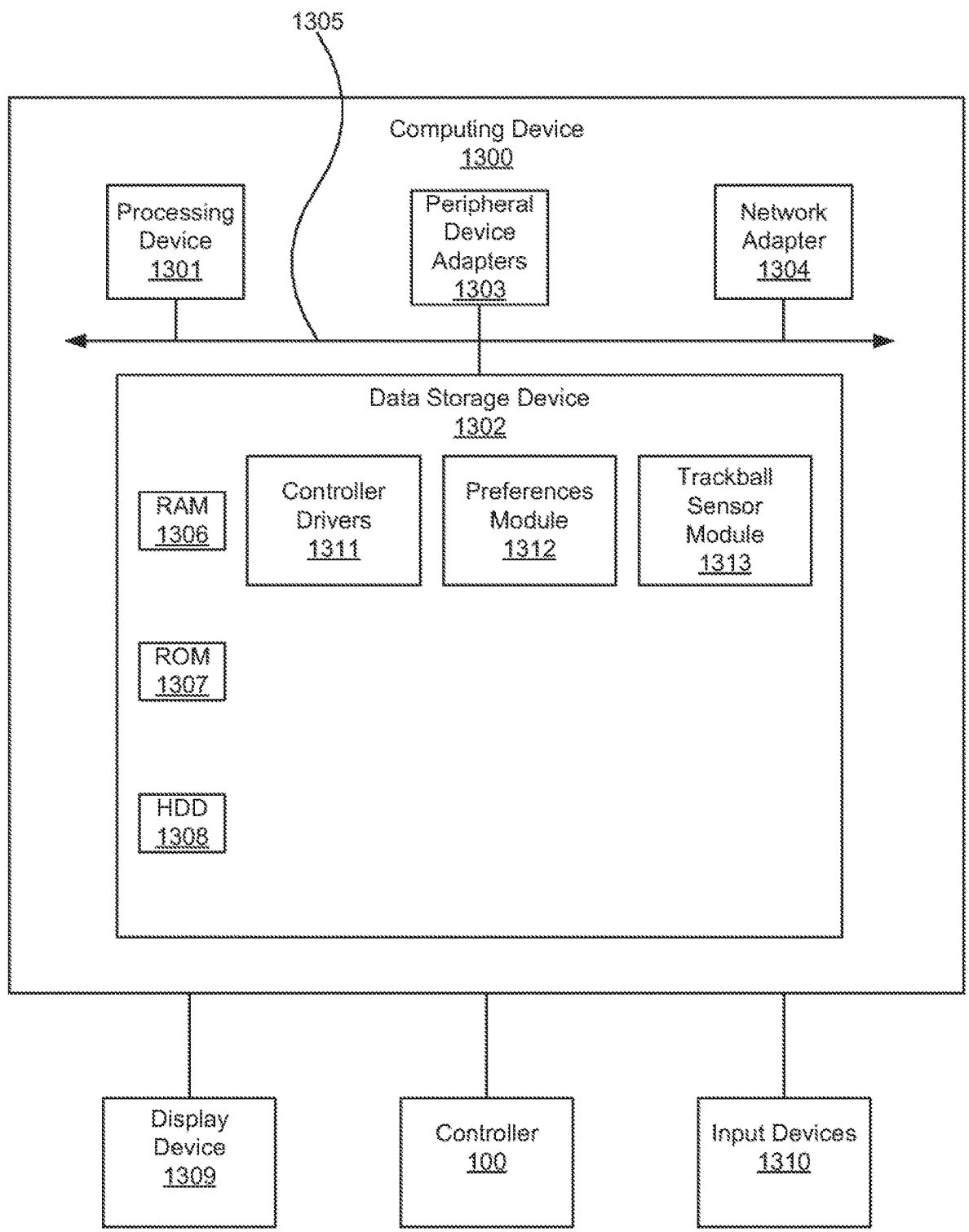
FIG. 13 is a block diagram of a computing system utilizing a controller, according to one example of the principles described herein.

Having described several examples of the controller (100, 200, 300, 400, herein after referred to collectively as controller (100)), the manner in which input from the various elements of the controller (100) may be mapped and cause a selected object displayed on the display device to be panned, rotated, zoomed, controlled, or combinations thereof. FIG. 13 is a block diagram of a computing device (1300) utilizing a controller (100), according to one example of the principles described herein. The computing device (1300) may be implemented in an electronic device. Examples of electronic devices include servers, desktop computers, laptop computers, personal digital assistants (PDAs), mobile devices, smartphones, gaming systems, and tablets, among other electronic devices.

To achieve its desired functionality, the computing device (1300) comprises various hardware components. Among these hardware components may be a number of processors (1301), a number of data storage devices (1302), a number of peripheral device adapters (1303), and a number of network adapters (1304). These hardware components may be interconnected through the use of a number of busses and/or network connections. In one example, the processor (1301), data storage device (1302), peripheral device adapters (1303), and a network adapter (1304) may be communicatively coupled via a bus (1305).

The processor (1301) may include the hardware architecture to retrieve executable code from the data storage device (1302) and execute the executable code. The executable code may, when executed by the processor (1301), cause the processor (1301) to implement at least the functionality of identifying input from a controller (100) and interpreting that input to cause a selected object displayed on a display device (1309) to pan, rotate, zoom, be controlled, or combinations thereof, according to the methods of the present specification described herein. In the course of executing code, the processor (1301) may receive input from and provide output to a number of the remaining hardware units.

The data storage device (1302) may store data such as executable program code that is executed by the processor (1301) or other processing device. As will be discussed, the data storage device (1302) may specifically store computer code representing a number of applications that the processor (1301) executes to implement at least the functionality described herein.

The data storage device (1302) may include various types of memory modules, including volatile and nonvolatile memory. For example, the data storage device (1302) of the present example includes Random Access Memory (RAM) (1306), Read Only Memory (ROM) (1307), and Hard Disk Drive (HDD) memory (1308). Many other types of memory may also be utilized, and the present specification contemplates the use of many varying type(s) of memory in the data storage device (1302) as may suit a particular application of the principles described herein. In certain examples, different types of memory in the data storage device (1302) may be used for different data storage needs. For example, in certain examples the processor (1301) may boot from Read Only Memory (ROM) (1307), maintain nonvolatile storage in the Hard Disk Drive (HDD) memory (1308), and execute program code stored in Random Access Memory (RAM) (1306).

Generally, the data storage device (1302) may comprise a computer readable medium, a computer readable storage medium, or a non-transitory computer readable medium, among others. For example, the data storage device (1302) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (1303, 1304) in the computing device (1300) enable the processor (1301) to interface with various other hardware elements, external and internal to the computing device (1300). For example, the peripheral device adapters (1303) may provide an interface to input/output devices, such as, for example, display device (1309), the controller (100), and other input devices (1310) such as a mouse, or a keyboard. The peripheral device adapters (1303) may also provide access to other external devices such as an external storage device, a number of network devices such as, for example, servers, switches, and routers, client devices, other types of computing devices, and combinations thereof.

The display device (1309) may be provided to allow a user of the computing device (1300) to interact with and implement the functionality of the computing device (1300). Examples of display devices may include a virtual reality headset, a monitor, a light-emitting diode (LED) display, a cathode ray tube display, a television, a projected image, or other display devices.

The peripheral device adapters (1303) may create an interface between the processor (1301) and the display device (1309), a printer, or other media output devices. The network adapter (1304) may provide an interface to other computing devices within, for example, a network, thereby enabling the transmission of data between the computing device (1300) and other devices located within the network.

The computing device (1300) further comprises a number of modules used in the implementation of identifying input from a controller (100) and interpreting that input to cause a selected object displayed on a display device (1309) to pan, rotate, zoom, be controlled, or combinations thereof. The various modules within the computing device (1300) comprise executable program code that may be executed separately. In this example, the various modules may be stored as separate computer program products. In another example, the various modules within the computing device (1300) may be combined within a number of computer program products; each computer program product comprising a number of the modules.

The computing device (1300) may include a number of controller drivers (1311) to control the controller (100). The controller driver (1311) may be any software that provides an interface to the computing device (1300), and enables operating systems and other computer programs executed on the computing device (1300) to access hardware functions without needing to know precise details of the hardware being used. The controller drivers (1311) may communicate with the controller (100) through the bus (1305) or communications subsystem to which the controller (100) connects. When a program executed by the computing device (1300) such as, for example, a computer-aided design (CAD) program, calls or invokes a routine in the controller drivers (1311), the controller drivers (1311) issue commands to the controller (100). Once the controller (100) sends data back to the controller drivers (1311), the controller drivers (1311) may invoke routines in the original calling program.

The computing device (1300) may also include a preferences module (1312) to, when executed by the processor (1301), accept user input regarding what action is taken when the wheel (130) is rotated, when the trackball (140) is rotated, when the controller (100) is moved along the surface, when the buttons (404-1, 404-2) are selected, or combinations thereof. In one example, a default preference may be set regarding the actuation of each of the elements of the controller (100). Further, a user may define the preferences regarding the actuation of each of the elements of the controller (100). Tables 1 through 3 provides different examples of default or user preferences that may be set as to actuation of the wheel, (130), the trackball (140), the movement of the controller (100) along the surface, and the buttons (404-1, 404-2), and how an object displayed on the display device (1309) reacts or how the program such as a CAD program reacts to these types of controller actuations and corresponding inputs.

TABLE 1

Example of Controller Preferences

| Controller Actuation Type | Displayed Object-Movement |
| --- | --- |
| Movement of trackball about the z-axis (i.e. yaw) | Movement of the displayed and selected object about the z-axis (i.e. yaw) |
| Movement of trackball about the x-axis (i.e. pitch) | Movement of the displayed and selected object about the x-axis (i.e. pitch) |
| Movement of trackball about the y-axis (i.e. roll) | Movement of the displayed and selected object about the y-axis (i.e. roll) |
| Movement of controller from a forward position to a back position along the surface | Movement of the displayed and selected object from a forward position to a back position |
| Movement of controller from a back position to a forward position along the surface | Movement of the displayed and selected object from a back position to a forward position |
| Rotation of the wheel in a clockwise direction | Movement of the displayed and selected object in a down direction |
| Rotation of the wheel in a counter-clockwise direction | Movement of the displayed and selected object in an up direction |
| Selection of a first button | Change of mode |
| Selection of a second button | Change of drawing element |

TABLE 2

Example of Controller Preferences

| Controller Actuation Type | Displayed Object Movement |
| --- | --- |
| Movement of trackball about the z-axis (i.e. yaw) | Camera viewing the displayed and selected object orbits along a horizontal plane |
| Movement of trackball about the x-axis (i.e. pitch) | Camera viewing the displayed and selected object orbits along a vertical plane |
| Movement of trackball about the y-axis (i.e. roll) | Camera viewing the displayed and selected object rolls about the y-axis |
| Movement of controller from a forward position to a back position along the surface | Camera pans forward relative to the displayed and selected object |
| Movement of controller from a back position to a forward position along the surface | Camera pans backward relative to the displayed and selected object |
| Movement of controller from a left position to a right position along the surface | Camera pans right relative to the displayed and selected object |
| Movement of controller from a right position to a left position along the surface | Camera pans left relative to the displayed and selected object |
| Rotation of the wheel in a clockwise direction | Camera pans down relative to the displayed and selected object |
| Rotation of the wheel in a counter-clockwise direction | Camera pans up relative to the displayed and selected object |
| Selection of a first button | Change of mode |
| Selection of a second button | Toggle between an orthographic view and a perspective view of the displayed and selected object |

TABLE 3

Example of Controller Preferences

| Controller Actuation Type | Displayed Object Movement |
| --- | --- |
| Movement of trackball about the z-axis (i.e. yaw) | Camera viewing the displayed and selected object rotates about the z-axis (i.e. yaw) |
| Movement of trackball about the x-axis (i.e. pitch) | Camera viewing the displayed and selected object rotates about the x-axis (i.e. pitch) |
| Movement of trackball about the y-axis (i.e. roll) | Camera viewing the displayed and selected object rotates about the y-axis (i.e. roll) |
| Movement of controller from a forward position to a back position along the surface | Camera pans forward relative to the displayed and selected object |
| Movement of controller from a back position to a forward position along the surface | Camera pans backward relative to the displayed and selected object |
| Movement of controller from a left position to a right position along the surface | Camera pans right relative to the displayed and selected object |
| Movement of controller from a right position to a left position along the surface | Camera pans left relative to the displayed and selected object |
| Rotation of the wheel in a clockwise direction | Camera zooms in to the displayed and selected object |
| Rotation of the wheel in a counter-clockwise direction | Camera zooms out from the displayed and selected object |
| Selection of a first button | Change of mode |
| Selection of a second button | Selection of a displayed object |

The selection of one of the buttons (404-1, 404-2) may be used to change the functions of the various elements from among different default and user-defined preference sets. For example, a button (404-1, 404-2) may be selected by a user to switch between the controller preferences defined in Table 1 and controller preferences defined in Table 3.

The ability of a user to move or after the view of an object displayed in, for example, a 3D model program such as a CAD program allows the user to limit his or her interaction with other input devices (1310) such as a mouse, a keyboard, or other input devices. As mentioned above, a user may find it difficult or inconvenient to select a button on a mouse or keyboard as well as adjust elements of a controller in order to alter the view of the object. This may prove especially difficult in situations where the user is also using a virtual reality system where he or she is wearing a virtual reality headset that obstructs the user's view of a secondary input device (1310) such as a mouse or keyboard. The examples described herein allow the user to use other input devices (1310) such as a mouse or a touchpad to modify a selected object displayed on a display device while using the controller (100) to alter the view of the object as to panning, rotating, zooming, and controlling the object, or combinations thereof.

The action assignments assigned to the actuation of the wheel (130), the trackball (140), the controller (100) relative to a surface, and the buttons (404-1, 404-2) described in Tables 1 through 3 are examples, and all the action assignments may be user-defined or defined by default differently. This allows the user to customize the controller (100) and its functions in a manner that allows the user to learn to use the controller (100) faster. Further, because the controller (100) operates based on user-defined preferences, the user may be as productive as possible in a shorter amount of time. Still further, the combination of the wheel (130), the trackball (140), the controller (100) relative to a surface, and the buttons (404-1, 404-2) create a singular input device can be applied to a wide variety of use cases including, for example, 3D CAD applications, medical operations, operational applications, or other machines that allows a user to control complex movement. The singular input provided by the controller (100) allows for the user to control of movements with one hand that may otherwise take the user two hands to perform. The controller (100) streamlines and simplifies the control of a 3D model in a digital space.

The computing device (1300) may also include a trackball sensor module (1313) to, when executed by the processor (1301), isolate or decouple physical measurements of the yaw, pitch, and roll of the trackball to obtain separate and distinct yaw, pitch, and roll measurements. As depicted in FIGS. 1 through 12, the controller (100) may include two sensors (150-2, 150-3) that are used to measure motion of the trackball (140). Due to the acute or obtuse angles between the sensors (150-2, 150-3), it may be difficult to obtain X- and Y-axis measurements that are completely decoupled from the Z-axis measurements. A described above, in one example, sensor (150-2) may detect pitch and roll, and sensor (150-3) may detect yaw. During the operation of the trackball (140), a user may intend on moving the trackball (140) about, for example, the x-axis equating to, for example, a roll of the trackball (140), but may, during the movement of the trackball (140), also move the trackball (140) about the y- or z-axis equating to the pitch and yaw of the trackball (140), respectively. The trackball sensor module (1313) decouples the Y and Z measurements by applying a negative bias to the Z measurements in proportion to the measurement of movement on the Y axis. Given a measurement:

$$[dX, dY, dZ] \qquad \text{Eq. 1}$$

the result of the de-biasing operation provided by the trackball sensor module (1313) may be calculated as:

$$[dX, dY, dZ - CdY] \qquad \text{Eq. 2}$$

where the constant C may be varied depending on the actual angle between the sensors (150-2, 150-3) to obtain a natural feeling to the appearance of the 3D model as it moves in relation to the trackball (140). Equation 2 may be extended to support other sensor (150, 1, 150-2, 150-3) arrangements. For example, if sensor (150-2) and sensor (150-3) were placed horizontally relative to one another, then the Eq. 2 becomes [dX, dY, dZ−CdX].

The constant C may be tuned to the controller (100) to achieve a feeling of accurately translating movement of the trackball (140) to movement on the display device (1309). In one example, the constant C may equal 0.58. This value of C may provide the user a natural feeling rotation match between the trackball (140) and the displayed object.

Once the x-, y-, and z-axes are decoupled, they can be used to orient an object being viewed or modeled accumulating them into a quaternion that represents the orientation of the displayed object relative to the world coordinates by the following method:

$$Q_{object} = \text{quaternion.fromEuler}(X*S, 0, 0) * Q_{object} \qquad \text{Eq. 3}$$

$$Q_{object} = \text{quaternion.fromEuler}(0, Y*S, 0) * Q_{object} \qquad \text{Eq. 4}$$

$$Q_{object} = \text{quaternion.fromEuler}(0, 0, Z*S) * Q_{object} \qquad \text{Eq. 5}$$

where S is a constant scaling factor chosen to map from controller (100) distance measurements to angle of movement such that the rotation of the trackball (140) has a responsive and natural feel to the user. In the example described above, the de-biasing calculation may be performed in floating point notation. In another example, however, for a hardware implementation, the calculation may be performed using fixed-point notation.

The trackball sensor module (1313) makes it possible to design a controller (100) without sensors (150-2, 150-3) that are located at orthogonal angles. Thus, the design of the controller (100) may be made more attractive, and space may be freed behind the trackball (140) for additional input elements on the controller (100). In one example, the sensors (150-2, 150-3) may be placed at a physical angle of separation that naturally decouples the axes. In another example, if the above solution is not possible, then a solution to coupled measurements may include searching for an axis of rotation and rotational angle around that axis that produces the measured results. However, the trackball sensor module (1313) approximates the values that would be obtained from such a search without the iterative calculations. In one example, the trackball sensor module (1313) is small and efficient enough to be implemented into firmware of the controller (100) without affecting the controller (100) report rate. Thus, in one example, the trackball sensor module (1313) may be embodied within a storage device of the controller (100).

In one example, the controller drivers (1311), preferences module (1312), and trackball sensor module (1313) may be stored on a memory device embodied on the controller. In this example, the controller drivers (1311), preferences module (1312), and trackball sensor module (1313) may be executed by the computing device (1300) by accessing the memory on the controller (100). In another example, the controller drivers (1311), preferences module (1312), and trackball sensor module (1313) may be copied from the controller (100) to the computing device (1300), and stored in the data storage device (1302) and executed by the computing device (1300) from the data storage device (1302). In still another example, the controller drivers (1311), preferences module (1312), and trackball sensor module (1313) may be obtained from a networked computing device via the network adapter (1304) such as, for example, from an internet or intranet website that provides the controller drivers (1311), preferences module (1312), and trackball sensor module (1313) as downloadable data.

Figure 14:
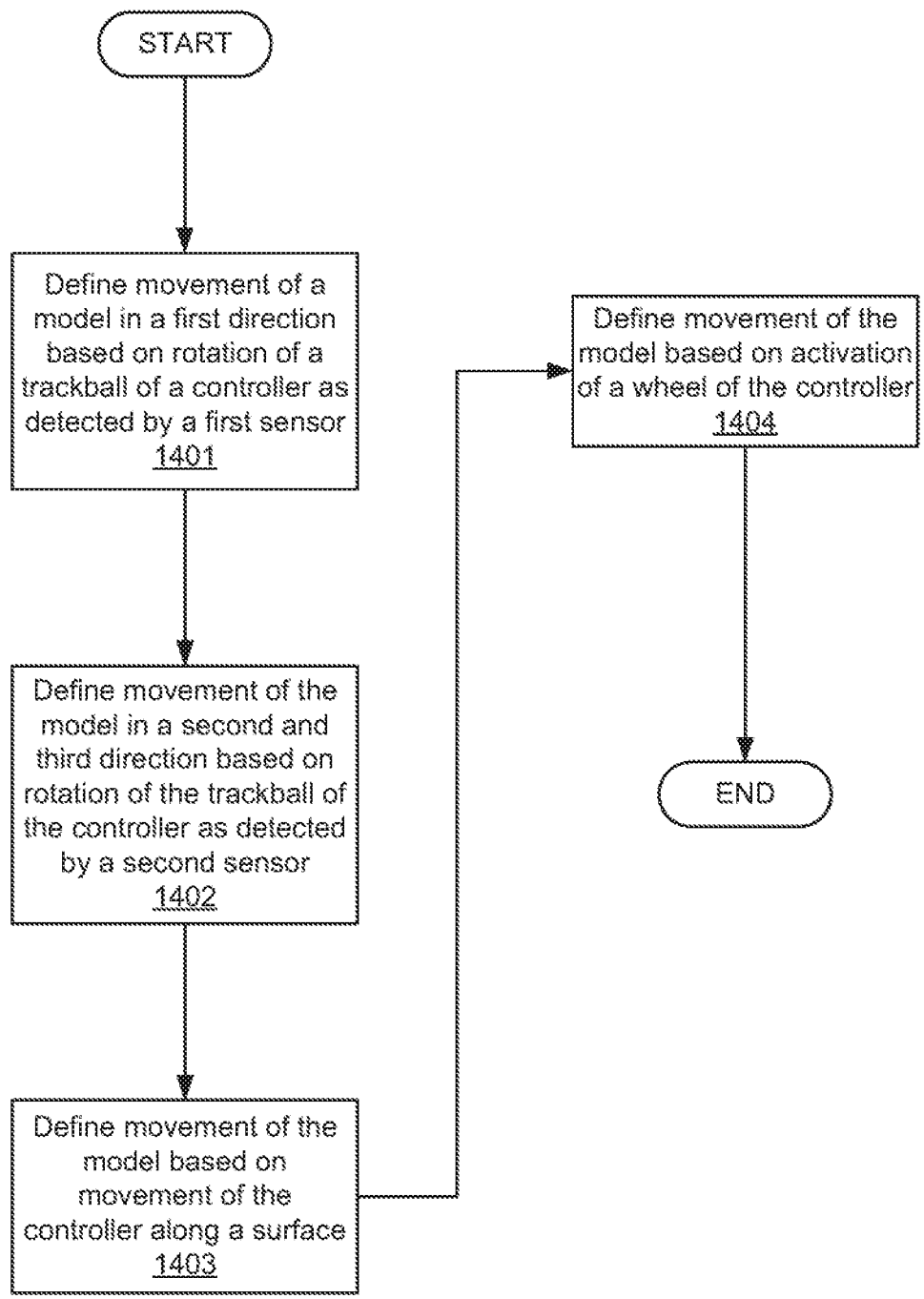
FIG. 14 is a method of interpreting input of a three-dimensional (3D) model controller, according to one example of the principles described herein.

FIG. 14 is a method of interpreting input of a controller (100), according to one example of the principles described herein. In one example, the controller (100) is a three-dimensional (3D) model controller. The method may include defining (block 1401) a movement of a model in a first direction based on rotation of the trackball (140) of the controller (100) as detected by a first sensor (150-2, 150-3). In one example, the movement of the model may include, for example, movement of a 3D model within a CAD program or other 3D modeling program. The movement of the model in a second and third direction may be defined (block 1402) based on rotation of the trackball (140) of the controller (100) as detected by a second sensor (150-2, 150-3). In one example, the movement of the trackball (140) in the first, second, and third directions described at blocks 1401 and 1402 may define the roll, pitch, and yaw of the model.

The method may continue by defining (block 1403) movement of the model based on movement of the controller along a surface. In one example, the movement of the controller along the surface defines panning of the mode. Movement of the model may be defined (block 1404) based on activation of the wheel (130) of the controller (100). In one example, the activation of the wheel (130) may define a zoom level of the model.

Figure 15:
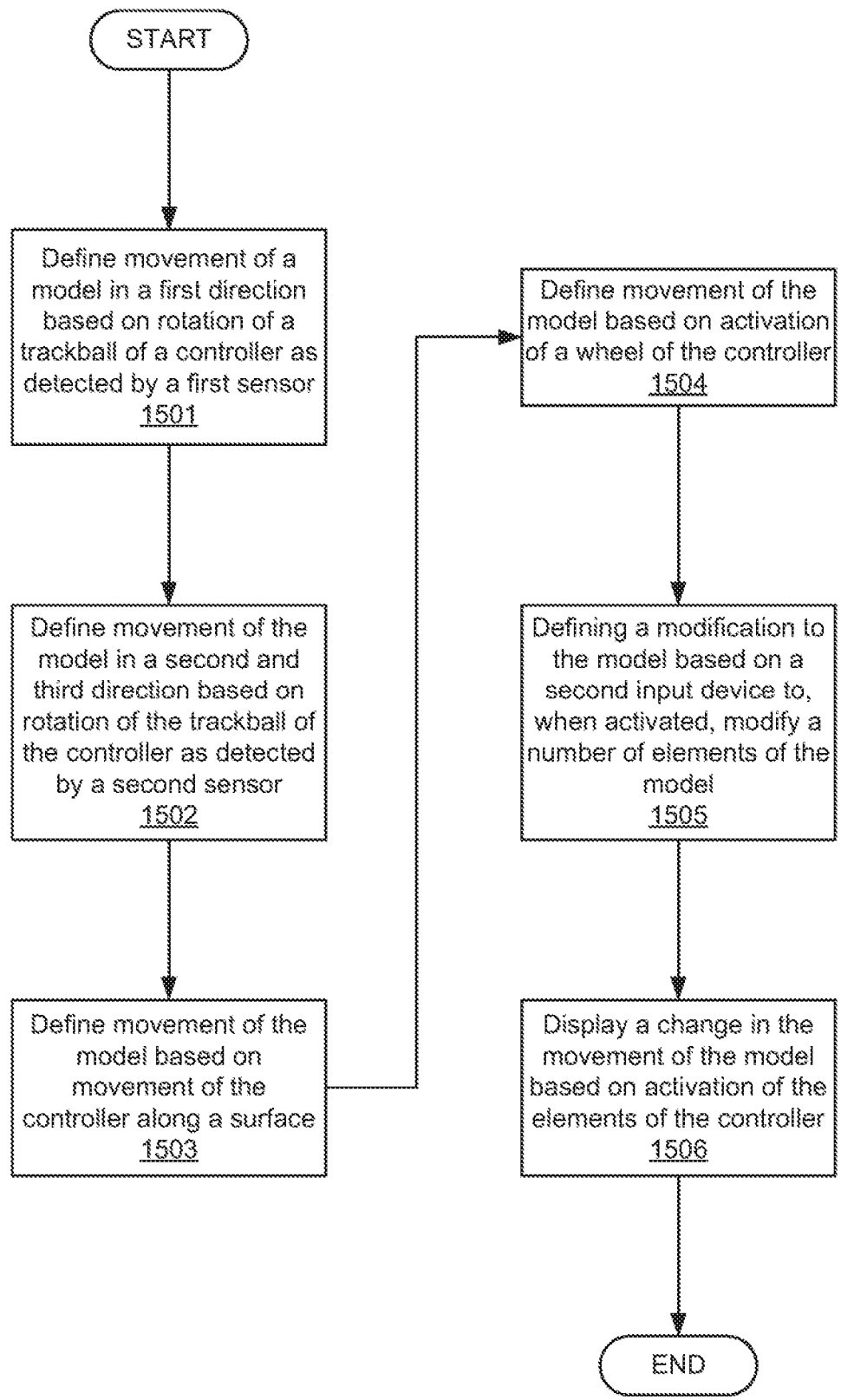
FIG. 15 is a method of interpreting input of a three-dimensional (3D) model controller, according to another example of the principles described herein.

FIG. 15 is a method of interpreting input of a three-dimensional (3D) model controller, according to another example of the principles described herein. The method of FIG. 15 may include defining (block 1501) a movement of a model in a first direction based on rotation of the trackball (140) of the controller (100) as detected by a first sensor (150-2, 150-3). In one example, the movement of the model may include, for example, movement of a 3D model within a CAD program or other 3D modeling program. The movement of the model in a second and third direction may be defined (block 1502) based on rotation of the trackball (140) of the controller (100) as detected by a second sensor (150-2, 150-3). In one example, the movement of the trackball (140) in the first, second, and third directions described at blocks 1501 and 1502 may define the roll, pitch, and yaw of the model.

The method may continue by defining (block 1503) movement of the model based on movement of the controller along a surface. In one example, the movement of the controller along the surface defines panning of the mode. Movement of the model may be defined (block 1504) based on activation of the wheel (130) of the controller (100). In one example, the activation of the wheel (130) may define a zoom level of the model.

The method of FIG. 15 may further include defining (1505) a modification to the model based on a second input device to, when activated, modify a number of elements of the model. As described herein, other input devices (FIG. 13, 1310) may be used together with the controller (100). In this example, the other input devices (FIG. 13, 1310) may be a mouse, a touch pad, a touchscreen, or other input device that allows the user to make modifications to the model while using the controller (100) to rotate, pan, and zoom the model.

The computing device (1300) causes the display device (1309) to display (block 1506) movement of the model on the display device (1309) based on the defined movements of the trackball (140) in the first, second, and third directions, the movement of the controller (100) along the surface, and activation of the wheel of the controller (100). Activation of each of the trackball (140), the wheel (130), and the controller (100) with respect to the surface may be assigned a corresponding movement of the model on the display device (1309) as described herein. In one example, the movement of the trackball (140) in the first, second, and third directions may be assigned to movement of the displayed model about the x-, y-, and z-axis such that the model pitches, rolls, and yaws, respectively. Further, in one example, the movement of the controller (100) along the surface may be assigned to panning of the displayed model. Still further, in one example, rotation of the wheel may be assigned to a zooming into and away from the displayed model. However, as described herein, these assignments may be user-definable.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (1301) of the computing device (1300), the controller (100), or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a model controller that includes a trackball, a first sensor adjacent to the trackball to detect a first coordinate movement of the trackball, a second sensor adjacent to the trackball to detect a second and a third coordinate movement of the trackball, a third sensor to detect movement of the model controller along a surface, and a fourth sensor to detect movement of a wheel coupled to the model controller.

The model controller provides for a convenient and intuitive input device that allows a user to control the yaw, pitch, roll, panning, and zooming with a single input device through the use of the trackball, wheel, and movement of the controller relative to a surface. Further, because of the ability to assign different movements of the model displayed on the display device to the trackball, the wheel, and the movement of the controller relative to a surface as detect by sensor (150-1), the user may learn how to use the controller (100) in a layout that best suits his or her use case and is easiest for that particular individual to learn. This greatly speeds up the learning associated with the use of the controller. The ability to provide all three axis of input via the trackball, and provide panning and zooming as well in the single controller makes the controller a more effective input device. The controller may operate all controls regarding movement of a displayed model without the use of a keyboard or mouse and without the user's learning and memorization of key combinations or trying to locate a mouse or keyboard in a virtual reality system.

The preceding description has been presented to illustrate and describe examples of the principles described. This description is not intended to be exhaustive or to limit these principles to any precise form disclosed. Many modifications and variations are possible in light of the above teaching.

What is claimed is:

1. A model controller comprising:
    a body;
    a trackball held in a socket built into the body, wherein less than half of the trackball is covered by the body;
    a first sensor adjacent to the trackball to detect a first coordinate movement of the trackball;
    a second sensor adjacent to the trackball to detect a second and a third coordinate movement of the trackball; and
    a wheel to encircle one of the first sensor and the second sensor.

2. The model controller of claim 1, further comprising:
    a third sensor to detect movement of the model controller along a surface; and
    a fourth sensor to detect movement of a wheel coupled to the model controller.

3. The model controller of claim 2,
    wherein the first, second, and third coordinate movements of the trackball define the roll, pitch, and yaw of a model,
    wherein the movement of the model controller along the surface as detected by the third sensor defines a panning of the model, and
    wherein the movement of a wheel coupled to the model controller as detected by the fourth sensor defines a zooming of the model.

4. The model controller of claim 1, wherein:
    the first sensor and the second sensor are located on different planes, and
    the different planes are approximately perpendicular to one another, obtuse with respect to one another, or acute with respect to one another.

5. The model controller of claim 1, further comprising a number of buttons, wherein the activation of at least one of the buttons results in a mode selection.

6. The model controller of claim 1, further comprising a number of nodules formed in the body to reduce an amount of contact between a trackball and a sensor bed.

7. The model controller of claim 1, further comprising a wheel positioned on the body in a horizontal orientation below the trackball.

8. The model controller of claim 1, further comprising a wheel positioned on the body in a vertical orientation to a side of the trackball.

9. A system for three-dimensional (3D) model manipulation comprising:
    a 3D model controller to control a display of a 3D model on a display device, comprising a body;
    a trackball held in a socket built into the body, wherein less than a quarter of the trackball is covered by the body;
    a first sensor adjacent to the trackball to detect a first coordinate movement of the trackball;
    a second sensor adjacent to the trackball to detect a second and a third coordinate movements of the trackball II, wherein the first, second, and third coordinate movements of the trackball define the roll, pitch, and yaw of a 3D model; and
    a wheel to encircle one of the first sensor and the second sensor and a second input device to, when activated, modify a number of elements of the 3D model.

10. The system of claim 9, further comprising:
a third sensor to detect movement of the 3D model controller along a surface;
a fourth sensor to detect movement of a wheel coupled to the model controller,
wherein the movement of the 3D model controller along the surface as detected by the third sensor defines a panning of the 3D model, and
wherein the movement of the wheel coupled to the model controller as detected by the fourth sensor defines a zooming of the model.

11. The system of claim 9, wherein the second input device is a mouse, a digital pen, a digital pad, a touchpad, a keyboard, or combinations thereof.

12. The system of claim 9, wherein the display comprises a virtual reality display, wherein actuation of the trackball, the wheel, the third sensor, or a combination thereof is displayed on the virtual reality display.

13. The system of claim 9, wherein the first, second and third sensors are optical sensors.

14. A computer program product for interpreting input of a three-dimensional (3D) model controller, the computer program product comprising:
a non-transitory computer readable storage medium comprising computer usable program code embodied therewith, the computer usable program code to, when executed by a processor:
detect one movement from a group of a yaw movement, a pitch movement, and a roll movement of a trackball by a first sensor;
detect two movements from the group by a second sensor, wherein the two movements detected by the second sensor correspond to movements not detected by the first sensor;
decouple yaw movement, pitch movement, and roll movement measurements to obtain separate and distinct yaw, pitch, and roll measurements;
define a first coordinate movement of a 3D model based on a movement detected by the first sensor; and
define a second coordinate movement and a third coordinate movement of the 3D model based on the two movements detected by the second sensor.

15. The computer program product of claim 14, further comprising computer usable program code to, when executed by the processor:
define panning of the 3D model based on movement of the 3D model controller along a surface; and
define a zoom level of the 3D model based on activation of a wheel of the 3D model controller.

16. The computer program product of claim 14, wherein the first, second, and third coordinate movements define the roll, pitch, and yaw of the 3D model.

17. The computer program product of claim 14, further comprising computer usable program code to, when executed by the processor, define a modification to the 3D model based on a second input device to, when activated, modify a number of elements of the 3D model.

18. The computer program product of claim 14, further comprising computer usable program code to, when executed by the processor:
display movement of the 3D model on a display device based on the first, second, and third coordinate movements;
display panning of the 3D model based on movement of the 3D model controller along the surface; and
display a change in the zoom level of the 3D model based on activation of the wheel of the 3D model controller.

* * * * *